United States Patent
Iarochenko et al.

(10) Patent No.: US 6,479,922 B2
(45) Date of Patent: Nov. 12, 2002

(54) PIEZOELECTRIC MOTOR

(75) Inventors: Alexander M. Iarochenko, Toronto (CA); V'Yacheslav V. Lavrinenko, Kiev (UA)

(73) Assignee: Eontech Group Inc., Toronto (CA)

( * ) Notice: Subject to any disclaimer, the term of this patent is extended or adjusted under 35 U.S.C. 154(b) by 0 days.

(21) Appl. No.: 09/947,699

(22) Filed: Sep. 7, 2001

(65) Prior Publication Data

US 2002/0033651 A1 Mar. 21, 2002

(30) Foreign Application Priority Data

Sep. 18, 2000 (CA) .............................................. 2320011

(51) Int. Cl.[7] .............................................. H01L 41/04
(52) U.S. Cl. ....................................................... 310/328
(58) Field of Search ............................. 310/328, 323.02

(56) References Cited

U.S. PATENT DOCUMENTS

| | | | |
|---|---|---|---|
| 4,019,073 A | * 4/1977 | Vishnevsky et al. | 310/322 |
| 4,210,837 A | * 7/1980 | Vasiliev et al. | 310/323.02 |
| 4,325,264 A | * 4/1982 | Sashida | 310/323.02 |
| 4,400,641 A | * 8/1983 | Vishnevsky et al. | 310/323.02 |
| 4,453,103 A | 6/1984 | Vishnevsky et al. | |
| 4,884,002 A | * 11/1989 | Eusemann et al. | 310/323.02 |
| 4,959,580 A | 9/1990 | Vishnevsky et al. | |
| 5,719,461 A | * 2/1998 | Peclat et al. | 310/323.02 |
| 2002/0017831 A1 | * 2/2002 | Iarochenko et al. | 310/323.03 |

FOREIGN PATENT DOCUMENTS

| | | | |
|---|---|---|---|
| WO | WO 91/00599 A1 | * 1/1991 | |
| WO | WO 92/10874 | 6/1992 | |

* cited by examiner

Primary Examiner—Nestor Ramirez
Assistant Examiner—Peter Medley
(74) Attorney, Agent, or Firm—Jeffrey S. Melcher; Manelli Denison & Seltzer, PLLC

(57) ABSTRACT

A piezoelectric motor comprising a stator; a rotor having a rotor inner circumferential surface; a piezoelectric element retained on the stator; power supply means in communication with said piezoelectric element to operably effect longitudinal resilient mechanical oscillations in the element; a plurality of pusher members each having (a) at least one first portion defining a pusher abutting surface abutting the rotor inner surface, (b) at least one second portion defining a piezoelectric element engaging surface distal of the pusher abutting surface, and (c) a third portion defining a retained surface; retainer means in abutment with the pusher member retained surface to releasably retain the pusher member in abutment with the piezoelectric element engaging surface and the rotor inner surface and wherein the longitudinal resilient mechanical oscillations effect coplanar movement of the pusher member; and the first portion is so shaped and inclined as to operably effect circumferential movement of the circumferential surface when the pusher member conducts longitudinal resilient mechanical movements induced by the piezoelectric effect element to effect rotary movement of the rotor inner circumferential surface relative to the piezoelectric element. The motor can be readily disassembled and repaired.

13 Claims, 3 Drawing Sheets

PIEZOELECTRIC MOTOR

BACKGROUND OF THE INVENTION

1. Field of the Invention

The invention relates to piezoelectric devices and, more specifically, piezoelectric motors, being electric motors using piezo crystals for providing rotational momentum to a rotor part of the motor relative a stator part of the motor.

2. Description of the Prior Art

A piezoelectric motor is known from U.S. Pat. No. 4,453,103, granted Jun. 5, 1984, comprising a stator and a rotor, which are in mechanical contact with one another along at least one cylindrical surface of friction interaction. Elastically curved, longitudinally elongated plates/pushers, which are set against the friction surface at one end, and are positioned at an angle to the same surface, while being anchored at the other end, either directly or via a metal membrane, to the cylindrical surface of the ring piezoelectric element with electrodes for exciting longitudinal oscillations of the perpendicular surfaces of friction interaction.

U.S. Pat. No. 4,959,580, issued Sep. 25, 1990 describes a piezoelectric motor, possessing the same attributes, except that the pushers are at one end anchored on the flat surface of the ring piezoelectric element.

The maximum power which can be supplied to the piezoelectric element of the above motors is determined by the maximum braking strength of the piezoelectric element or the strength of the bond between the electrodes of the piezoelectric element coating and the ceramics, when the pushers are anchored on the piezoelectric element's surface. A small diameter of the piezoelectric element will not allow a large number of pushers to be anchored in order to increase the motor's torque moment. Solving the above problems requires increasing the diameter of the piezoelectric element and, consequently, the piezoelectric element's volume, which significantly increases the motor's size and cost. The presence of recesses in the piezoelectric element and the thermal shocks that the piezoelectric ceramics is subjected to when the pushers' connections are being soldered on it, notably reduces the motor's reliability, especially in the modes of operation approaching the limit of tolerance. Moreover, such is the technology of anchoring pushers that it requires sizable expenditures when each new type of motor is introduced to the manufacturing process.

SUMMARY OF THE INVENTION

It is an object of the invention to provide piezoelectric motors of improved reliability.

It is a further object to provide piezoelectric motors which can be readily disassembled and repaired.

The aforesaid objects are achieved in a general sense by use of retainer means which embrace the piezoelectric element and presses one end of the pusher in satisfactory acoustic contact with the piezoelectric element. The retainer is releasable when desired to free the pusher plates for replacement and the like.

Accordingly, in one aspect the invention provides a piezoelectric motor comprising:

a stator;

a rotor having a rotor inner circumferential surface;

a piezoelectric element retained on said stator;

power supply means in communication with said piezoelectric element to operably effect longitudinal resilient mechanical oscillations in said element;

a plurality of pusher members each having (a) at least one first portion defining a pusher abutting surface abutting said rotor inner surface, (b) at least one second portion defining a piezoelectric element engaging surface distal of said pusher abutting surface, and (c) a third portion defining a retained surface;

retainer means in abutment with said pusher member retained surface to releasably retain said pusher member in abutment with said piezoelectric element engaging surface and said rotor inner surface and wherein said longitudinal resilient mechanical oscillations effect coplanar movement of said pusher member;

and said first portion is so shaped and inclined as to operably effect circumferential movement of said rotor circumferential surface when said pusher member conducts longitudinal resilient mechanical movements induced by said piezoelectric effect element to effect rotary movement of said rotor inner circumferential surface relative to said piezoelectric element.

Preferably, the retainer means comprises (a) a ring member having a diameter and a circumferential inner surface having at least one portion engageable with a said support surface of said third portion of said pusher member to retain said pusher member in suitable engagement with said piezoelectric element and said rotor circumferential surface, and (b) ring diameter adjusting means connectable to said ring to enable said ring diameter to be changed.

Most preferably, each of the pusher members is a curved, longitudinally elongated member formed of a plastics material.

BRIEF DESCRIPTION OF THE DRAWINGS

In order that the invention may be better understood, preferred embodiments will now be described by way of example only with reference to the accompanying drawings wherein.

DETAILED DESCRIPTION OF PREFERRED EMBODIMENTS

Figure 1:
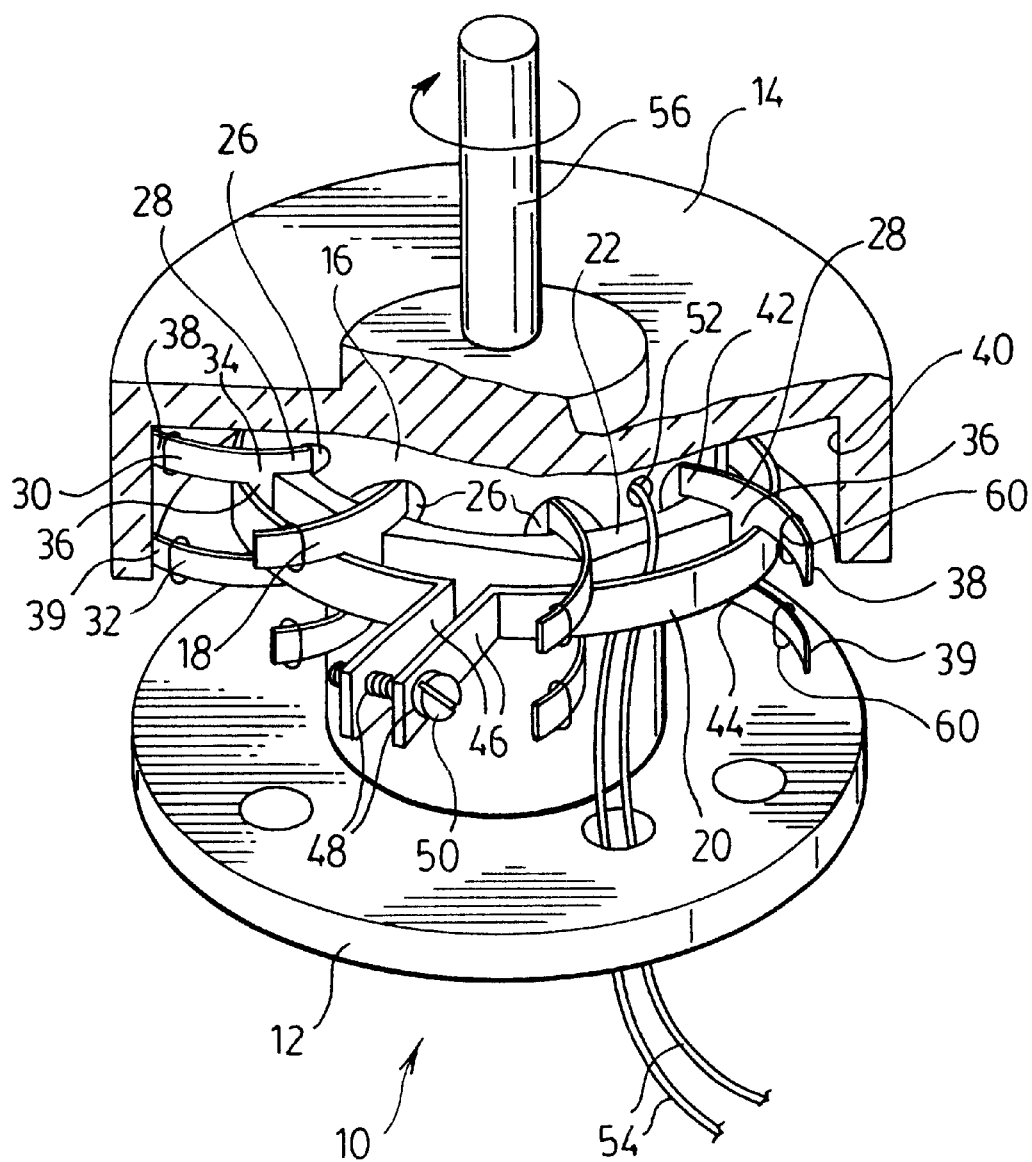
FIG. 1 shows a partly-cut away perspective view of a piezoelectric motor according to the invention.

With reference to FIG. 1 this shows the piezoelectric motor generally as 10 having a disc stator 12, a barrel rotor 14, piezoelectric element 16 in the form of a disc or washer, a plurality of curved, elastic longitudinally elongate pusher members 18, a retaining strap or band 20, and a hexagonal hollow separator 22.

Figure 2:
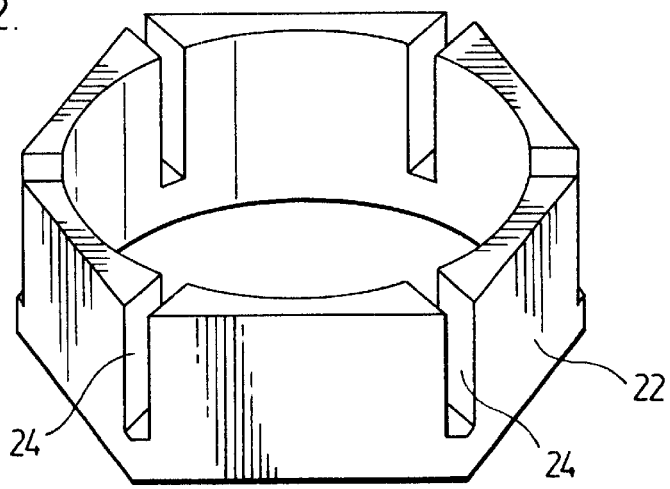
FIG. 2 shows a perspective view of a separator of use in a piezoelectric motor according to the invention.

In more detail, with reference also to FIG. 2, separator 22 is mounted on stator 12 and embraces element 16 at an upper part thereof. Separator 22 has a plurality of circumferential, longitudinally, vertically aligned apertures 24, each co-radial with a plurality of vertically aligned recesses 26 in element 16 which receives through apertures 24, a plurality of terminal portions 28 of pusher members 18. Separator 22 secures the position of pusher members 18 between piezoelectric element 18 and retaining band 20.

Each of pusher members 18 in the embodiments shown is in the form of the letter H missing one leg and placed on one side to provide a pair of parallel elongate upper and lower members 30, 32, respectively, joined at their central portions 34 by a body 36 and having terminal portions 38, 39, respectively, in abutment with inner circumferential surface 40 of rotor. Only upper member 30 extends to terminal portion 42 distal of its terminal portion 38 and in acoustic contact with piezoelectric element 16 in recess 26. Terminal portion 44 of lower member 32 distal to portion 39, terminates at body 36.

Retaining band 20 encircles separator 22, piezoelectric element 16, and the plurality of bodies 36 of pusher members 18 to retain the latter to the stator assembly, so aligned as aforesaid.

Band 20 in the embodiment of FIG. 1 is formed of a resiliently flexible material, such as a plastic or metal, which band 20 has a pair of opposed radially outstanding lugs 46 having screw threaded apertures 48 by which an adjustable screw 50 is threaded to effect opening or closing of band 20 to cause a reduction or enlargement of the diameter of the band and, consequently, tightening or loosening of pusher member 18, for inspection and/or replacement.

Piezoelectric element 16 has a pair of opposed electrical contacts (only one contact 52 shown) on its upper and lower surfaces in communication with an AC voltage source (not shown) through leads 54.

Rotor 14 is connected to a shaft 56 by which torque is relayed to the motor load via the rotor through pusher members 18 from piezoelectric element 16.

The shape of pusher members 18 can vary, for example, they can be L-shaped, exaggerated U-shape or n-shape, provided at least one extended arm abuts piezoelectric element 18 and it has a body portion retainable by band 20.

Figure 3A:
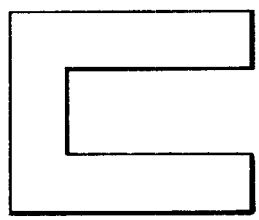
FIGS. 3A–3C are diagrammatic representations of cross-sections of various pushers of use in a piezoelectric motor according to the invention.
Figure 3B:
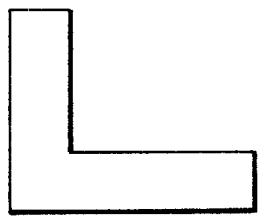
Figure 3C:
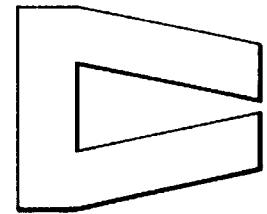

Embodiments of some alternative pusher member shapes are shown in FIGS. 3A, 3B and 3C.

Pusher members 18 are, preferably, bent at an angle of up to 10° from the piezoelectric element radius in its horizontal plane to reduce the risk of damage to element 16 by over tightening of pusher members 18 thereto by band 20. Excess pressure will cause pusher member 18 to resiliently bend.

To reduce the risk of band 20 contracting element 16, a sufficient minimum number of pusher members 18 should be used, particularly when the starting torque of the motor is proportional to the number of pusher members 18.

Figure 4A:
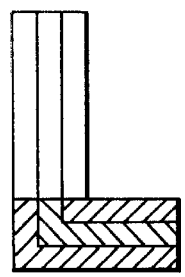
FIGS. 4A and 4B are diagrammatic cross-sections of embodiments of groups of pushers of use in a piezoelectric motor according to the invention.
Figure 4B:
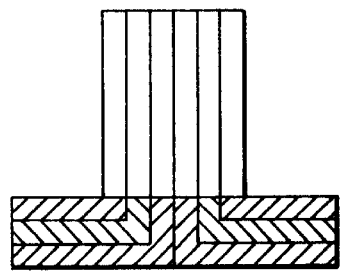

In alternative embodiments, the pusher members 18 may be assembled in one or more groups of abutting members 18, as shown, for example, in FIGS. 4A and 4B.

As shown in FIG. 1, retainer band 20 is generally formed of a single, integrally formed member having aforesaid lugs, screw and inter-lug distance.

Figure 5:
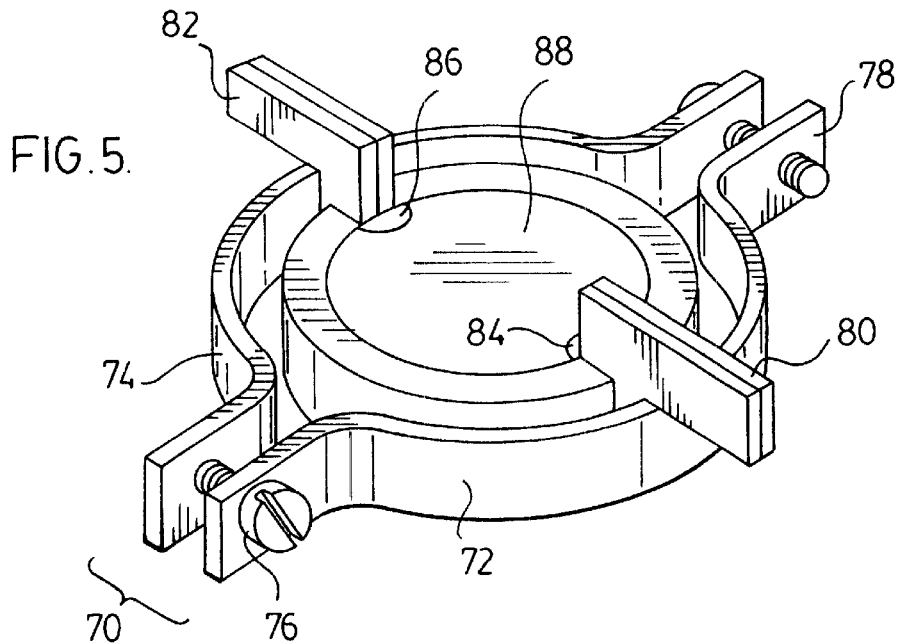
FIG. 5 is a diagrammatic perspective view of an alternative retainer band, pusher and piezoelectric element assembly of use in a motor according to the invention.

However, in an alternative piezoelectric motor embodiment of use with piezoelectric elements of larger sizes and capacities, the retainer band may comprise two or three arc segments with associated pairs of terminal radially outstanding, tightening lugs, as shown in FIG. 5.

Retainer band 70 comprises two essentially semi-circular segments 72, 74 held by diametrically opposed screws 76, 78 to retain diametrically opposed pusher members 80, 82 in recesses 84, 86, respectively, of embraced piezoelectric disc 88.

Figure 6:
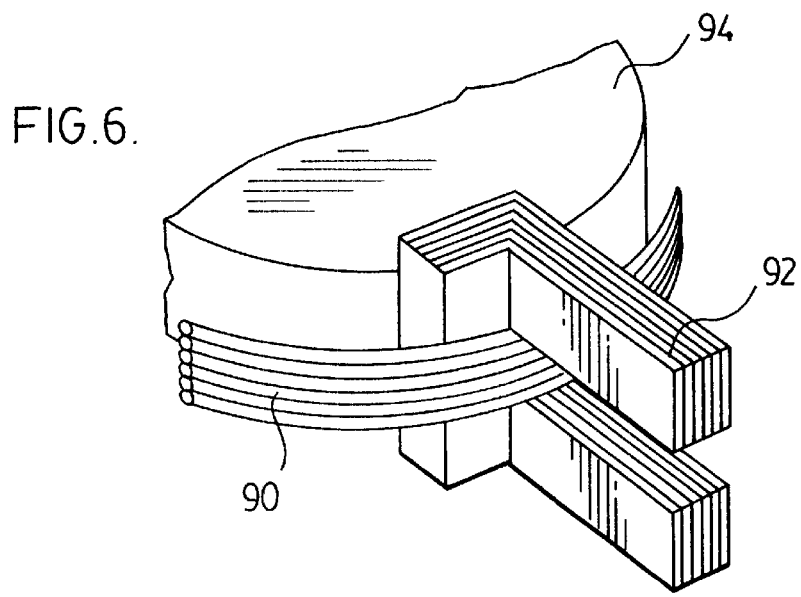
FIG. 6 is a diagrammatic perspective view, in part, showing a wire retainer band assembly of use in a motor according to the invention; and wherein the same numerals denote like parts.

For miniature motors, the retainer band may be constituted of a single or a plurality of revolutions of a fine steel wire 90 as shown in FIG. 6, to retain the plurality of abutting pusher members 92 against piezoelectric element 94.

For motors operating well within its operating limits, the piezoelectric element preferably has the aforesaid described apertures to receive the pusher member ends. However, such apertures noticeably lower the mechanical strength of the piezoelectric element, and, accordingly, such apertures should be reduced in size or eliminated when increased power is demanded for the motor.

DESCRIPTION OF OPERATION

In operation, voltage from an AC electric power source, (not shown), with an oscillation frequency equal to or approximately to the resonance frequency of one of the radial oscillation modes of piezoelectric element 16, is applied to electrodes 52 of piezoelectric element 16 through leads 54.

Due to the reverse piezoelectric effect, the voltage is converted by piezoelectric element 16 to longitudinal radial resilient mechanical oscillations.

Acoustically connected to pusher members 18, piezoelectric element 16 relays the oscillations to pusher members 18. The acoustic connection band is attained by means of clamping pusher members 18 to piezoelectric element 16 with retaining band 20. When screw 50 is tightened, it tightens band 20. When band 20 clamping force exceeds the mechanical stress on the cylindrical surface of piezoelectric element 16, a continuous acoustic contact occurs between pusher 18 and piezoelectric element 16. With this, the resilient oscillations of piezoelectric element 16 are relayed to pushers 18 with tangent forces occurring on their ends conjugated by frictional interaction with inner circumferential surface, which sets rotor 14 into revolution in relation to piezoelectric element 16 and band 20, which together form stator 12 assembly of the motor. The principle of the motor operation remains unchanged if a reverse assembly is made and the motor is secured to rotor 14. Then, stator 12 will function as a rotor.

It will be readily understood, also, that the principle of the motor operation remains unchanged if pushers 18 are clamped only by means of ring 20.

Assembling pushers 18 in packages does not introduce any changes in the motor operation either, since the pushers 18 assembled in a package work independently from one another.

In some instances, sub-harmonic oscillations might occur in pusher members 18 during motor operation, and be manifested into whistling. To eliminate such an effect, a damping ring 60 made of a soundproofing material, e.g. rubber, is placed on each of pusher members 18. The use of such rings 60 also results in the simultaneous wear and tear of all the pushers contained in one package.

Installation of separator 22 does not affect the motor operation and is done mainly to facilitate manufacturing of the motor. Similarly, pusher members 18 can be connected with one another or with band 20, for example, by means of electric point welding.

If piezoelectric element 16 does not have slots, there is much reduced risk of it being broken by mechanical stresses not exceeding the allowable limit for the particular type of piezoelectric ceramic material. Furthermore, additional radial compression raises the breaking strength of the piezoelectric ceramic material.

However, if the piezoelectric element is broken, it can be readily and easily replaced by a new one. Accordingly, if the motor has exhausted its resource on account of wear and tear of the pusher members 18, they can also be replaced by new spare ones, without compromising the characteristics of the motor.

Although this disclosure has described and illustrated certain preferred embodiments of the invention, it is to be understood that the invention is not restricted to those particular embodiments. Rather, the invention includes all embodiments which are functional or mechanical equivalents of the specific embodiments and features that have been described and illustrated.

What is claimed is:

1. A piezoelectric motor comprising:

a stator;

a rotor having a rotor inner circumferential surface;

a piezoelectric element retained on said stator;

power supply means in communication with said piezoelectric element to operably effect longitudinal resilient mechanical oscillations in said element;

a plurality of pusher members each having (a) at least one first portion defining a pusher abutting surface abutting said rotor inner surface, (b) at least one second portion defining a piezoelectric element engaging surface distal of said pusher abutting surface, and (c) a third portion defining a retained surface;

retainer means in abutment with said pusher member retained surface to releasably retain said pusher member in abutment with said piezoelectric element and said rotor inner surface and wherein said longitudinal resilient mechanical oscillations effect coplanar movement of said pusher member;

and said first portion is so shaped and inclined as to operably effect circumferential movement of said circumferential surface when said pusher member conducts longitudinal resilient mechanical movements induced by said piezoelectric effect element to effect rotary movement of said rotor inner circumferential surface relative to said piezoelectric element, characterized in that said retainer means comprising (a) a ring member having a diameter and a circumferential inner surface having at least one portion engageable with a said support surface of said third portion of said pusher member to retain said pusher member in suitable engagement with said piezoelectric element and said rotor circumferential surface, and (b) ring diameter adjusting means connectable to said ring to enable said ring diameter to be changed.

2. A motor as defined in claim 1 wherein said ring diameter adjusting means comprises at least one pair of parallel spaced radial lugs defining an interlug distance, each lug having a first end integral with said ring to define an intra-ring gap; and means for adjusting said interlug distance whereby said ring diameter is adjusted, to effect loosening or tightening of said pusher member to said piezoelectric element.

3. A motor as defined in claim 2 wherein said interlug distance adjusting means comprises a threaded member selected from a screw or bolt.

4. A motor as defined in claim 1 further comprising an outer ring member concentric and in abutment with said ring member.

5. A motor as defined in claim 1 wherein said retainer means comprises (a) at least one releasable wire having a diameter wire, a circumferential inner surface having at least one portion engageable with a said support surface of said third portion of said pusher member to retain said pusher member in suitable engagement with said piezoelectric element and said rotor circumferential surface, and (b) wire diameter release means connectable to said wire to enable said wire diameter to be varied.

6. A motor as defined in claim 1 wherein said pusher member has a body having a portion defining said retained surface in abutment with said retainer means; and at least one arm extending from said body and having a terminal portion constituting said first portion defining said pusher member abutting surface abutting said rotor abutting surface.

7. A motor as defined in claim 6 comprising a plurality of said arms.

8. A motor as defined in claim 6 further comprising at least one distal arm extending from said body and having a terminal portion constituting said second portion defining said piezoelectric element engaging surface.

9. A motor as defined in claim 8 comprising a plurality of said distal arms.

10. A motor as defined in claim 6 wherein said terminal portions abut said rotor abutting surface at a contact angle of less than 90°.

11. A motor as defined in claim 1 further comprising a support member disposed between said piezoelectric element and said retainer means and defining a hollow cylindrical aperture adapted to receive said piezoelectric element.

12. A motor as defined in claim 11 wherein said support member has at least one circumferential portion defining an axial aperture adapted to receive said second portion defining said piezoelectric element engaging surface.

13. A motor as defined in claim 1 wherein said pusher member is a curved, elastic and longitudinally elongated member.

* * * * *